(12) United States Patent
Cazoulat et al.

(10) Patent No.: US 10,225,599 B2
(45) Date of Patent: Mar. 5, 2019

(54) CONTROL SYSTEM FOR PLAYING A DATA STREAM ON A RECEIVING DEVICE

(71) Applicant: Orange, Paris (FR)

(72) Inventors: Renaud Cazoulat, Saint Gregoire (FR); Martin Conan, Cesson-Sevigne (FR); Marc Capdevielle, Cesson-Sevigne (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/368,208

(22) PCT Filed: Dec. 14, 2012

(86) PCT No.: PCT/FR2012/052948
§ 371 (c)(1),
(2) Date: Jun. 23, 2014

(87) PCT Pub. No.: WO2013/093310
PCT Pub. Date: Jun. 27, 2013

(65) Prior Publication Data
US 2015/0007224 A1 Jan. 1, 2015

(30) Foreign Application Priority Data
Dec. 23, 2011 (FR) .................................... 11 62444

(51) Int. Cl.
*H04L 29/06* (2006.01)
*H04N 21/41* (2011.01)
(Continued)

(52) U.S. Cl.
CPC ..... *H04N 21/42204* (2013.01); *H04L 65/608* (2013.01); *H04N 21/4126* (2013.01);
(Continued)

(58) Field of Classification Search
CPC ............. H04N 5/44543; H04N 5/4401; H04N 21/42204; H04N 21/4126; H04N 21/4222;
(Continued)

(56) References Cited

U.S. PATENT DOCUMENTS 8,060,637 B2 * 11/2011 Kayanuma .......... G06F 12/0802
709/219
8,856,852 B2 * 10/2014 Sharif-Ahmadi et al. .... 725/116
(Continued)

FOREIGN PATENT DOCUMENTS

EP         1819101 A1      8/2007

OTHER PUBLICATIONS

International Preliminary Report on Patentability (translation) dated Sep. 8, 2014 for corresponding International Application No. PCT/FR2012/052948, filed Dec. 14, 2012.
(Continued)

Primary Examiner — Nathan J Flynn
Assistant Examiner — Caroline Somera
(74) Attorney, Agent, or Firm — David D. Brush; Westman, Champlin & Koehler, P.A.

(57) ABSTRACT

A system includes a user interface for allowing a user to select a data stream to be played, a receiver for receiving the data stream to be played and a transmitter for transmitting the received data stream to a device that is capable of playing the stream. The system includes a first and a second device, which are separate from one another. The first device, called a receiving device, integrates the receiver and the transmitter. The second device, called a control device, integrates the user interface and, following the selection, by a user, of a stream to be played, transmits to the first device a command for playing the selected stream, the command containing data for locating the selected stream.

15 Claims, 5 Drawing Sheets

(51) Int. Cl.
*H04N 21/422* (2011.01)
*H04N 21/472* (2011.01)
*H04N 21/482* (2011.01)
*H04N 21/4363* (2011.01)

(52) U.S. Cl.
CPC ... *H04N 21/4222* (2013.01); *H04N 21/42221* (2013.01); *H04N 21/43637* (2013.01); *H04N 21/47202* (2013.01); *H04N 21/47217* (2013.01); *H04N 21/482* (2013.01)

(58) Field of Classification Search
CPC ....... H04N 21/42221; H04N 21/43637; H04N 21/47202; H04N 21/47217; H04N 21/482; H04L 65/608
See application file for complete search history.

(56) References Cited

U.S. PATENT DOCUMENTS

| | | | | |
|---|---|---|---|---|
| 2005/0240297 | A1* | 10/2005 | Scotzin et al. | 700/94 |
| 2006/0048201 | A1* | 3/2006 | Wolzien | H04N 5/4401 725/109 |
| 2007/0237090 | A1* | 10/2007 | Kim et al. | 370/252 |
| 2007/0239864 | A1* | 10/2007 | Kwon et al. | 709/223 |
| 2009/0288112 | A1* | 11/2009 | Kandekar | G11B 27/11 725/32 |
| 2009/0298535 | A1 | 12/2009 | Klein et al. | |
| 2010/0185987 | A1* | 7/2010 | Yang et al. | 715/838 |
| 2010/0205615 | A1* | 8/2010 | Kim et al. | 719/318 |
| 2010/0228758 | A1* | 9/2010 | Lim et al. | 707/758 |
| 2011/0116124 | A1 | 5/2011 | Shin | |
| 2011/0121520 | A1* | 5/2011 | Badman | 277/616 |
| 2011/0131520 | A1* | 6/2011 | Al-Shaykh | H04L 12/2807 715/772 |
| 2011/0163939 | A1 | 7/2011 | Tam et al. | |
| 2011/0222424 | A1* | 9/2011 | Abhishek | H04W 72/02 370/252 |
| 2011/0275316 | A1* | 11/2011 | Suumaki | G06K 7/10237 455/41.1 |
| 2012/0051344 | A1* | 3/2012 | Taylor | H04W 48/18 370/338 |
| 2012/0079112 | A1* | 3/2012 | Buer | H04W 12/08 709/225 |
| 2012/0089699 | A1* | 4/2012 | Cholas | H04L 12/2812 709/217 |
| 2012/0159340 | A1* | 6/2012 | Bae et al. | 715/738 |
| 2012/0162537 | A1* | 6/2012 | Maddali | H04N 21/4126 348/734 |
| 2013/0007817 | A1* | 1/2013 | Park | H04N 21/4104 725/81 |
| 2013/0057913 | A1* | 3/2013 | Park | G06F 21/608 358/1.15 |
| 2013/0060910 | A1* | 3/2013 | Kim | H04N 21/4122 709/219 |
| 2013/0067107 | A1* | 3/2013 | Klemets | 709/231 |
| 2013/0086222 | A1* | 4/2013 | Kazawa | H04L 67/02 709/219 |
| 2013/0097512 | A1* | 4/2013 | Hong | G06F 3/0484 715/736 |
| 2013/0125179 | A1* | 5/2013 | Sharif-Ahmadi et al. | 725/82 |
| 2013/0135179 | A1* | 5/2013 | Ko | G09G 5/00 345/2.2 |
| 2013/0173818 | A1* | 7/2013 | Tseng | H04N 21/2343 709/231 |
| 2013/0182193 | A1* | 7/2013 | Shintani | H04N 21/42204 348/738 |
| 2013/0247117 | A1* | 9/2013 | Yamada | G08C 17/02 725/93 |
| 2015/0016417 | A1* | 1/2015 | Dees | G06F 1/1698 370/331 |

OTHER PUBLICATIONS

International Search Report and Written Opinion dated Mar. 12, 2013 for corresponding International Application No. PCT/FR2012/052948, filed Dec. 14, 2012.

Monica Fernandez et al., "Empowering UPnP/DLNA for IPTV Services", Internet Communications (BCFIC RIGA), 2011 Baltic Congress on Future, IEEE, Feb. 16, 2011 (Feb. 16, 2011), pp. 7-12, XP031983047.

Allegro Software Development Corporation: "Networked Digital Media Standards. A UPnP/ DLNA Overview" Internet Citation, Oct. 26, 2006 (Oct. 26, 2006), p. 25PP, XP007906879.

Notice of Opposition dated May 4, 2016 for corresponding European Application No. 2795845.

Heredia, "An Overview of the DLNA Architecture", Windows Devices and Media, Rally Technologies, Spring 2008.

* cited by examiner

CONTROL SYSTEM FOR PLAYING A DATA STREAM ON A RECEIVING DEVICE

CROSS-REFERENCE TO RELATED APPLICATIONS

This Application is a Section 371 National Stage Application of International Application No. PCT/FR2012/052948, filed Dec. 14, 2012, which is incorporated by reference in its entirety and published as WO 2013/093310 on Jun. 27, 2013, not in English.

FIELD OF THE DISCLOSURE

The present invention relates to a control system for playing a data stream.

BACKGROUND OF THE DISCLOSURE

Digital video decoding boxes, commonly called Set-Top Boxes (STB), allow video content such as television programs or video content of VOD (Video On Demand) type to be accessed through a digital transmission network (by Internet, satellite or TNT, for example).

Moreover, the STBs can integrate other functions:
a hard disk allowing a program to be recorded during a predefined time frame or on the fly in order to allow a user to pause the current TV program and view it later;
Internet access;
a Web radio broadcast service;
DLNA support allowing navigation in a file manager of a computer playing a DLNA server role and allowing a content stored on the computer to be played;
etc.

These numerous functions make use of the STB complex. In order to use a function, a user has to navigate in a graphical interface that is displayed on the screen of a television using a specific remote control. Taking account of the legibility constraints caused by display on a TV screen and of the constraints linked to the use of a remote control for navigating in the graphical interface, said graphical interface often lacks simplicity and convenience of use. Moreover, all of these functions increase the cost of the STB.

SUMMARY

An aspect of the present disclosure concerns a control system for playing a data stream comprising
user interface means for allowing a user to select a data stream to be played,
means for receiving the data stream to be played,
means for transmitting the received data stream through the external output means to a device that is capable of playing the stream,
characterized by the fact that it comprises a first and a second device, which are separate from one another,
the first device, called a receiving device, integrating the means for receiving the data stream and the means for transmitting the received stream through the external output means, and
the second device, called a control device, integrating the user interface means and comprising means for, following the selection, by a user, of a stream to be played, transmitting to the first device a command for playing the selected stream, said command containing data for locating the selected stream.

The invention therefore involves separating the user interface means allowing selection of the stream to be played and the means for managing the data stream (that is to say in order to receive it and retransmit it to a device that is capable of playing it) into two separate devices, a control device and a receiving device, respectively. The control device obtains the address for locating the stream to be played and transmits it to the receiving device, which then need only retrieve the stream at the supplied address. The control device can provide a user-friendly user interface, without the constraints of display and navigation on a television screen. Moreover, the receiving device may be the simplest possible from a technical point of view, without user interface means for selecting the stream to be played, which limits the cost thereof. According to the invention, the whole interactivity between the user and the user interface in order to select the stream is carried out at the control device.

Advantageously, the first device comprises means for setting up a direct wireless connection to the second connection device and receiving data for connection to a wireless access point and the second device comprises means for assisting the connection of the first device to a wireless access point, said means being designed to display a graphical interface for inputting data for connection of the first device to a wireless access point and to transmit said input connection data to the first device.

The first device may be suited to simulating a wireless access point. The second device can then connect directly to the first device. Owing to that fact, the receiving device may be devoid of user interface means for inputting the data required for connecting to a wireless access point.

The means for selecting a stream may comprise means for displaying graphical interface data, means designed to access a user interface for selecting content on a remote server and/or means designed to access a file manager on a storage server for a local area network to which the first and second devices belong.

The user interface data may comprise graphical interface data stored in the control device or data from a remote server or from a local server.

Advantageously, the first device is devoid of means for a user to select a video data stream to be played. The whole user interface allowing the selection of a stream to be played is thus situated on the second device.

The invention also concerns a receiving device for the previously defined system, comprising means for receiving a video data stream to be played, means for video output to an external device that is capable of playing the received stream, means for transmitting the stream of video data received through the video output means, means for receiving a control for playing a stream, said control containing an address for locating the stream.

The invention likewise concerns a control device for the system of claim 1, comprising user interface means for allowing a user to select a data stream to be played and means for, following the selection, by a user, of a stream to be played, transmitting to another device a command for playing the selected stream, said command containing an address for locating the selected stream.

The invention also concerns a control method for playing a data stream, comprising
a step of selection of a data stream to be played using user interface means,
a step of reception of the data stream to be played,
a step of transmission of the received data stream to a device that is capable of playing the stream,
characterized by the fact that the steps of reception of a data stream to be played and of transmission of the received data stream to a device that is capable of playing said stream are carried out by a first device, called a receiving device;

the step of selection of a data stream to be played is carried out by a second device, called a control device, which is separate from the first device, and provision is made for a step of transmission by the second device to the first device, following the selection, by a user, of a stream to be played, of a command for playing the selected stream, said command containing data for locating the selected stream.

BRIEF DESCRIPTION OF THE DRAWINGS

The invention will be better understood with the aid of the following description of a particular embodiment of the control system of the invention with reference to the appended drawings, in which.

DETAILED DESCRIPTION OF ILLUSTRATIVE EMBODIMENTS

Figure 1:
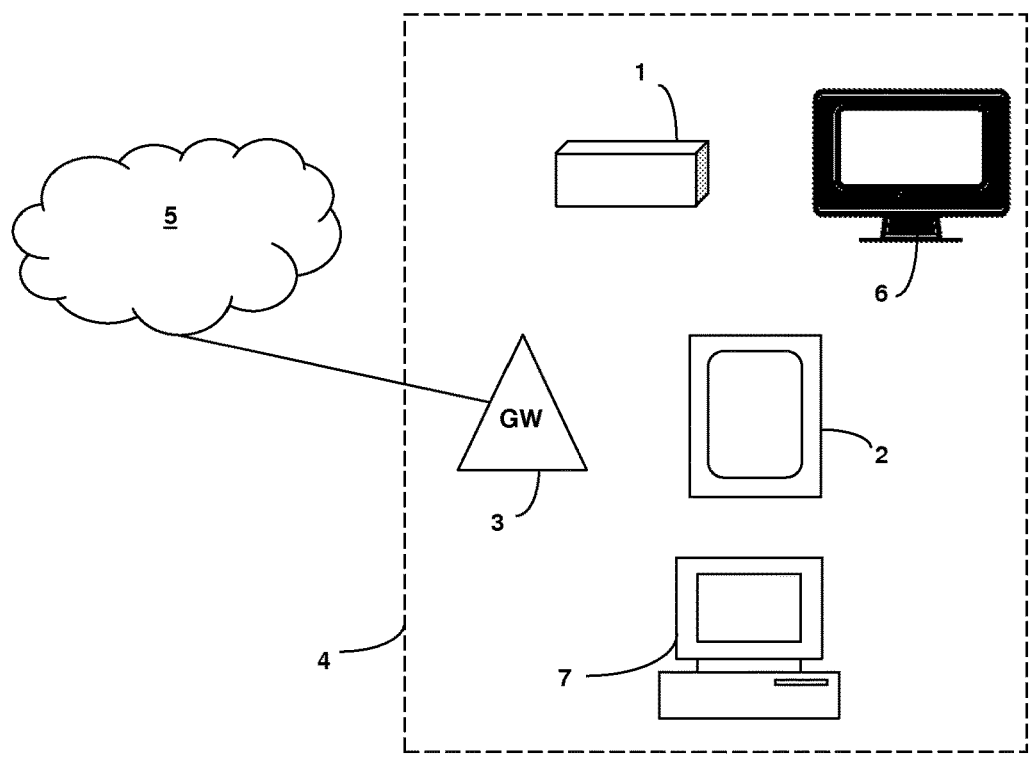
FIG. 1 shows a schematic view of the system according to a particular embodiment of the invention.

The system shown in FIG. 1 comprises a first device 1, called a receiving device, and a second device 2, called a control device, which are separate from one another.

The receiving device 1 and the control device 2 belong to a local area network 4 that is managed by a gateway 3, in this case a WiFi access point.

The gateway 3 is connected to an external communication network, in this case the Internet 5, for example by means of an ADSL (Asymmetric Digital Subscriber Line) line.

The local area network 4 likewise comprises a personal computer, or PC, 7 and a multimedia reproduction device 6, for example in this case a flat screen television.

The receiving device 1, the control device 2 and the computer 7 are connected to the gateway 3, by a wireless link, in this case a WiFi link. A wired connection could be envisaged between the equipment of the local area network 4 (1, 2 and/or 7) and the gateway 3. The receiving device 1 is connected to the multimedia reproduction device 6, in this case by HDMI connectors.

The receiving device 1, the control device 2, the multimedia reproduction device 6 and the PC 7 form a DLNA local area network. The DLNA (Digital Living Network Alliance) standard defines various actors:

the server: stores and provides digital content on demand;

the "renderer": decodes digital content in order to be able to play it;

the "player": plays the decoded content;

the controller: allows the content proposed by the servers to be browsed and to be played by the renderers/players.

In the particular example described here, DLNA actors are installed on the equipment of the DLNA network in the following manner:

the receiving device 1 plays a DLNA renderer part;

the control device 2 plays a DLNA renderer/player, DLNA server and DLNA controller part;

the PC 7 plays a DLNA server part and the multimedia reproduction device 6 plays a DLNA player part.

Figure 2:
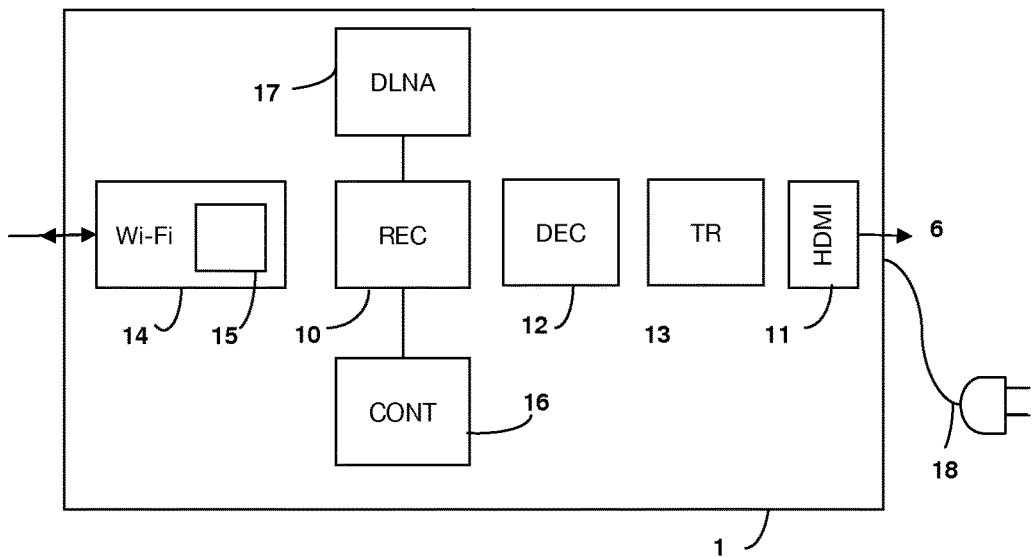
FIG. 2 shows a function block diagram of the receiving device of the system in FIG. 1.
Figure 3:
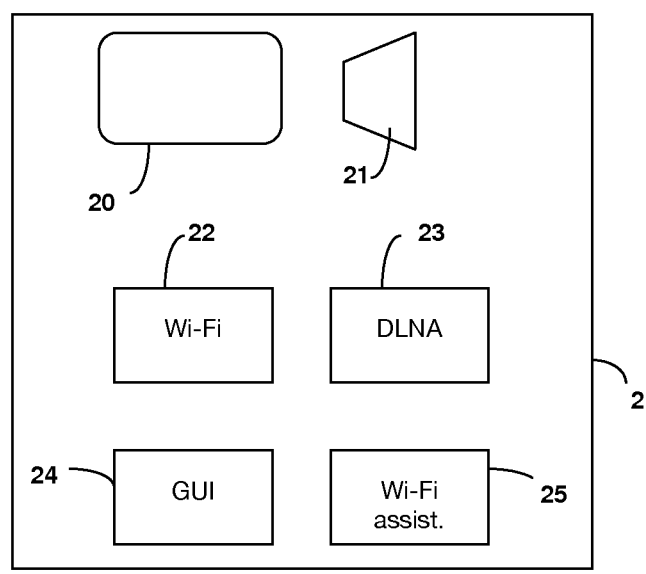
FIG. 3 shows a function block diagram of the control device of the system in FIG. 1.

There now follows a more detailed description of the receiving device 1. With reference to FIG. 2, this receiving device 1 comprises a module 10 for receiving a data stream to be played, an output interface 11 to an external device that is capable of playing the received stream;

a module 12 for decoding the received data stream;

a module 13 for retransmitting the data stream, having been received and decoded, through the output interface 11;

a wireless communication, in this case WiFi, module 14, integrating a submodule 15 for WiFi connection to a WiFi access point;

a module 16 for controlling the reception of a data stream; and a DLNA module 17.

The control module 16 is designed to, on receiving a command message from a control device (for example the control device 2), interpret the command message and transmit to the reception module 10 a command to retrieve a data stream to be played at a locating address indicated in the command message. This may be an address in the form of a URL, having an IP multicast address (in the case of a TV stream), an IP unicast address (in the case of a VOD stream), for a storage address on a server or a storage device (in the case of content stored in a local or remote server).

The reception module 10 is designed to, on receiving a command to retrieve a data stream, the command containing an address for locating the stream, retrieve the stream under consideration at the received locating address.

The decoding module 12, the input of which is connected to the reception module 10 and the output of which is connected to the retransmission module 13, is designed to decode a data stream received by the reception module 10 so that it is able to be played by an external reproduction device that is capable of playing the content, for example the multimedia reproduction device 6. The decoding comprises deciphering of the stream, if the latter is in ciphered form, decompression of the stream, if the latter is in compressed form, and format conversion so as to convert the format of the data in a received stream into a format that is compatible with the video output interface (in this case HDMI—High Definition Multimedia Interface).

The retransmission module 13, the input of which is connected to the decoding module 12 and the output of which is connected to the output interface 11, is designed to retransmit a data stream to be played, following decoding, through the output interface 11, to an external device that is capable of playing, that is to say reproducing, the stream. This external device may be the multimedia reproduction device 6, for example.

The output interface 11 in this case comprises a male HDMI (High Definition Multimedia Interface) connector.

The WiFi communication module 14 is designed to implement the WiFi communication protocol so as to use WiFi to communicate with other devices. The WiFi connection submodule 15 is designed to connect the receiving device 1 to a WiFi access point by using the ad hoc WiFi mode of operation, as will be described later on in the description of the method.

The DLNA module 17 is designed to implement the DLNA standard so as to interact, as a DLNA renderer, with other DLNA actors in the local area network 4, by means of the gateway 3. This DLNA module is designed to control the obtainment of a data stream on a DLNA server, and the decoding and reproduction of said data stream, according to the protocols defined by the DLNA standard.

The modules 10, 12, 13, 16, 17 are application (or software) modules.

Moreover, the receiving device 1 comprises a cable 18 fitted with a power supply plug and a central command module, not shown, to which all of the elements of the device 1 are connected and which is designed to control the operation of these elements.

It will be emphasized that the receiving device 1 is devoid of user interface means to allow a user to select a stream to be played.

The control device 2 is in this case a touch-sensitive digital tablet, for example an iPad©. The tablet 2 comprises, in a conventional manner, a touch-sensitive display screen 20, sound reproduction means 21, a wireless, in this case WiFi, communication module 22 and a DLNA module 23. It is capable of decoding and playing a data stream (video, audio, image) retrieved via the Internet on a storage device in the local area network 4 or stored in a memory that is specific to the tablet 2.

Moreover, said tablet comprises an application module 24 for a remote user interface for a receiving device such as the device 1 and an application module 25 for assisting the connection of a receiving device, such as the device 1, to a WiFi access point. The user interface module 24 allows a user interface GUI to be implemented on the tablet 2 in order to select a data stream to be played and in order to carry out various actions on this stream (pause, stop, fast forward or rewind).

The data stream to be played may correspond, by way of example, to a television program broadcast by a TV station, to a video on demand or to a content (video, audio or image) stored in a device in the local area network 4 (for example the tablet 2 or the PC 7) or provided by a Web server. The data streams can be accessed from various sources and can be selected by means of various user interfaces. The interface module 24 is designed to access these various selection user interfaces and to display them on the touch-sensitive screen of the tablet 2. The selection user interface data can be stored locally in the tablet 2 or may be accessible through a network (in this case the Internet or the local area network 4) on a server or a storage device.

In the particular example described here, the interface module 24 is designed to propose to a user, by displaying a graphical interface on the screen of the tablet 2, various sections corresponding to various types of stream: TV, VOD, my content (video, music, image), YouTube, etc.

In the particular example of the description, on selection of one of these sections, the interface module 24 is designed to access a selection graphical user interface or GUI and to display it on the screen of the control device 2. This interface may be accessible on a television service Web server, a video on demand (VOD) service Web server, a YouTube service Web server or a storage device in the local area network 4.

The interface GUI for selecting a TV program is provided by the television service Web server. It comprises, in a known manner, an electronic television program guide allowing access to a program schedule for various television stations and selection of a television program to be viewed.

The interface GUI for selecting a VOD is provided by the VOD Web server. It comprises, in a known manner, a VOD catalog and a keyword search engine. The VOD catalog and the search engine allow access, for each VOD, to a detailed information record and to commands that can be activated, in this case by touching the screen 20 of the control device 2, so as notably to show a VOD extract or to rent a VOD.

The interface GUI for selecting the YouTube service is accessible on a YouTube service Web server. It comprises, in a known manner, a catalog of videos that are available on YouTube and a keyword search engine.

The interface GUI for selecting "my content" (video, music, image) comprises a file manager allowing selection and launch of the reading of files stored on a storage device, in this case in the local area network 4, this device playing a DLNA server part. It would be possible to envisage accessing a manager for files that are stored on a storage device or a server that is remote from, external to, the local area network and can be accessed by means of an external network.

Moreover, following the selection of a stream to be played by a user and following a command from the user to play this stream on the reproduction device 6, the module 24 is designed to transmit to the receiving device 1 a "PLAY" command for playing the stream. The PLAY command contains the address for locating the stream to be played, in this case in the form of a URL.

The module 25 for assisting the connection is designed to, on reception of a connection request from a receiving device (for example the device 1), display a graphical user interface (or GUI interface) for inputting data for connection to a WiFi access point and to transmit the input connection data to the receiving device having access to the WiFi access point.

The DLNA module 23 is designed to implement the DLNA standard so as to interact, as a DLNA renderer/player, DLNA server or DLNA controller, with other DLNA actors in the local area network 4, by means of the gateway 3. This DLNA module is designed to control the obtainment of a data stream on a DLNA server, and the decoding and reproduction thereof, in order to provide data stream stored in the tablet 2, in order to allow the content stored in the tablet to be browsed and played by the renderers/players, according to the protocols defined by the DLNA standard.

The multimedia reproduction device 6 is in this case a flat screen television equipped with a female HDMI connector. It could be any other device that is capable of playing a multimedia content (video, audio or image).

The PC 7 stores multimedia content (video, audio, image). It plays a DLNA server part in the local area network 4.

Figure 4:
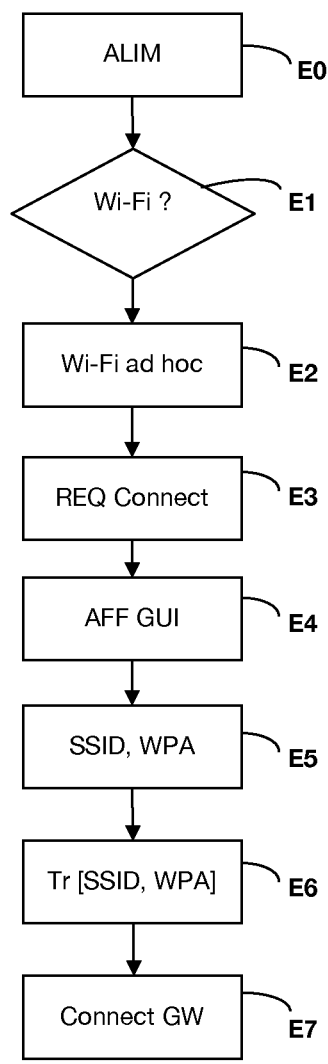
FIG. 4 shows a flowchart of the method steps implemented for connecting the receiving device in FIG. 1 to a gateway.
Figure 5A:
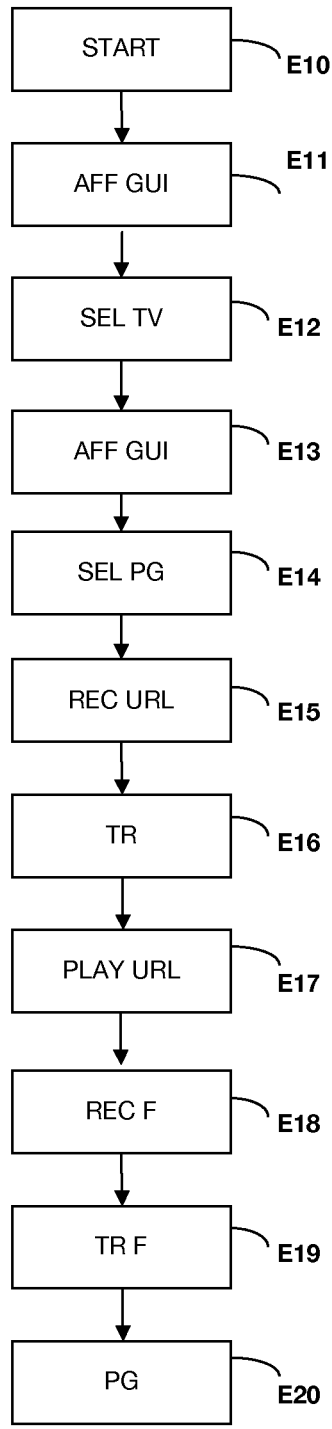
FIGS. 5A and 5B show the method steps implemented during the operation of the system in FIG. 1, according to two particular exemplary embodiments.
Figure 5B:
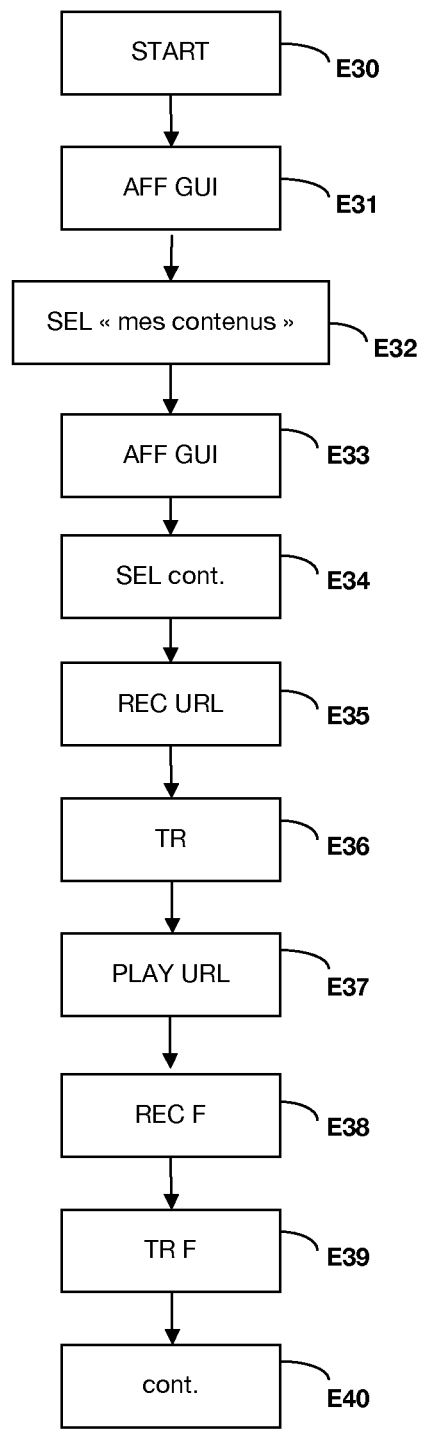

With reference to FIGS. 4, 5A and 5B, the operation of the system in FIG. 1 will now be described.

First of all, the steps implemented in order to connect the receiving device 1 to the gateway 3 will be described, in the knowledge that the device 1 is devoid of user interface means for allowing a user to input necessary data for connection to the gateway 3. The steps executed by the receiving device 1 are implemented by the WiFi connection submodule 15.

Since the receiving device 1 is devoid of user interface means, it is connected to the gateway 3 by means of the control device 2.

In a step E0, a user plugs the receiving device 1 into the mains in order to start it up.

In a test step E1, the receiving device 1 checks that it is connected to a WiFi access point (or WiFi terminal). If a valid WiFi connection has not yet been set up, the test is negative. In a step E2, the receiving device 1 then puts itself into an ad hoc WiFi mode of operation in order to set up a connection directly to the control device 2. The ad hoc WiFi mode involves, in a known manner, the receiving device 1 simulating a WiFi access point with a network name SSID (Service Set Identifier). The control device 2 connects to the receiving device 1 directly, in WiFi mode.

In a step E3, the receiving device 1 transmits a request for connection to a WiFi access point to the control device 2.

In a step E4, on reception of the request from the receiving device 1, the control device 2 displays a user interface for inputting information for connection to the local WiFi access point, or gateway, 3. The input interface asks the user to input the connection data that are necessary for connecting the receiving device 1 to the gateway 3. These connection data comprise a network name SSID and a security key, in this case a WPA key, which are associated with the gateway 3.

In a step E5, the user inputs the required connection data (SSID and WPA key that are associated with the gateway 3) using a keyboard, in this case a virtual keyboard, for the control device 2 and then validates the input data.

In a step E6, the control device 2 transmits the input connection information (SSID and WPA key of the gateway 3) to the receiving device 1, which records them in memory.

In a step E7, the receiving device 1 connects to the gateway 3, in WiFi mode, using the connection information provided by the control device 2.

Once the receiving device 1 has connected to the gateway 3, it interrupts the ad hoc WiFi mode of operation. The direct WiFi connection between the receiving device 1 and the control device 2 is then interrupted.

The steps that have just been described for connecting the receiving device 1 to the gateway 3 are implemented each time no valid WiFi connection to a WiFi access point is detected, in other words in the following two cases:
- upon first connection to a WiFi access point (as described previously) and
- in a new WiFi coverage area, when the receiving device 1 is moved into the coverage area of a new WiFi access point (outside the area covered by the previously recorded WiFi access point).

The receiving device 1 stores the connection data for the various access points to which it connects in memory so as to be able to automatically reconnect thereto if need be. When the receiving device 1 is in the coverage area of two recorded WiFi access points, it connects to the access point that has the strongest radio signal.

The tablet 2 likewise uses WiFi to connect to the gateway 3, in a known manner.

Once connected to the gateway 3 by means of WiFi, the receiving device 1 and the control device 2 are able to communicate with one another by means of the gateway 3.

There now follows a description of the steps implemented by the system in order to select and play a data stream on the multimedia reproduction device 6, for two exemplary embodiments.

In a first exemplary embodiment, the stream to be played is a TV program.

In a step E10, a user launches the interface application 24 on the control device 2 in order to select a stream to be played.

In a step E11, the control device 2 displays a graphical interface allowing the user to select one of the following sections: TV, VOD, YouTube, my content (video, music, image/photo).

In a step E12, the user selects one of the sections on the control device 2. According to the first exemplary embodiment, the user selects the TV section. In a step E13, the control device 2 uses its screen to display an interface for selecting TV programs, which are accessible on the television service Web server. The user thus uses the screen of the control device 2 to view the schedule of programs in progress on various television stations.

In a step E14, the user selects one of the programs using the control device 2, in this case by means of touch selection of this program on the screen of the device 2.

In a step E15, following selection of the program, the control device 2 receives an address for locating the stream on the network of the Internet. The address for locating the stream comprises an IP multicast address for broadcast of the selected TV program and appears in the form of a URL. On reception of the address for locating the selected stream, the control device 2 retrieves the stream at the received address and plays the stream in order to allow the stream to be previewed by the user on the control device 2.

In a step E16, the user carries out a specific action, for example touch selection of a command icon or a predefined touch gesture on the screen of the control device 2, in order to control transfer of the reading of the selected TV program to the multimedia reproduction device 6. The control device 1 then transmits to the receiving device 1, in a step E17, a "PLAY" command to play the selected program. The command contains the address for locating the TV program data stream to be played.

In a step E18, on reception of the command, the receiving device 1 interprets the received PLAY command and retrieves the selected TV program stream by using the locating address received in the command.

In a step E19, the receiving device 1 receives the TV program stream, decodes it and transmits it for reproduction through the HDMI output interface to the multimedia reproduction device 6.

In a step E20, the multimedia reproduction device 6 plays the TV program.

The control device 2 likewise allows the user to transmit other commands to the receiving device 1, such as notably "PAUSE" in order to pause a stream that is currently being read, "STOP" in order to stop the reading of the stream, a "FASTFORWARD N" command in order to read the stream at an acceleration of N times, "FASTBACKFORWARD N" in order to read the stream backwards at an acceleration of N times.

In a second exemplary embodiment, the data stream to be played is a video control stored locally in the PC 7. In this exemplary embodiment, the PC 7 plays the part of DNLA server, the control device 2 plays the parts of DLNA control, DLNA renderer and DLNA player, the receiving device 1 plays the part of DLNA renderer and the multimedia reproduction device 6 plays the part of DLNA player.

In a step E30, a user launches the interface application 24 in order to select a stream to be played from the tablet 2.

In a step E31, the control device 2 displays the graphical interface allowing the user to select one of the following sections: TV, VOD, YouTube, my content (videos, music, photos).

In a step E32, the user selects one of the sections, in this case my content, on the control device 2.

In a step E33, the control device 2 displays a file manager revealing a tree structure for files stored in a computer 7 and a tree structure for files stored in the control device 2.

In a step E34, the user selects a file to be played, for example corresponding to a video content, using the control device 2, by selecting—in this case by means of touch—the file on the screen of the device 2.

In a step E35, following the selection of the file to be played, the control device 2 plays the selected file so as to allow the user to preview it.

In a step E36, the user carries out a specific action in order to command the reproduction of the selected file on the reproduction device 6. This action may be touch selection of an icon displayed on the screen of the control device 2 or a specific touch gesture from the user on the screen of the control device 2.

In a step E37, the control device 2 transmits to the receiving device 1 a DLNA command to play the selected file, or data stream. The transmitted command contains the address for locating the selected file in the local area DLNA network. By way of example, if the user has selected a content stored on the computer 7, the command has a URL address pointing to the storage location of the corresponding file in the computer 7.

In a step E38, the receiving device 1 interprets the received command and retrieves the stream selected by the user from the computer 7, playing the part of DLNA server, using the received locating address.

In a step E39, the receiving device 1 receives the data stream of the selected file by means of streaming, that is to say continuously, decodes it and transmits it for reproduction through the HDMI output interface to the multimedia reproduction device 6.

In a step E40, the reproduction device 6 plays the received stream, in this case the video content stored on the computer 7 functioning as a DLNA server.

The scope of the invention is not limited to the two exemplary embodiments described above but extends to any data stream selected from the user interface of the control device 2 and received by the receiving device 1 in order to be played on a reproduction device.

Although the present disclosure has been described with reference to one or more examples, workers skilled in the art will recognize that changes may be made in form and detail without departing from the scope of the disclosure and/or the appended claims.

The invention claimed is:

1. A control system for playing a data stream, comprising:
a first device, called a receiving device, comprising:
  means for receiving the data stream to be played,
  means for transmitting the received data stream through an external output to a device that is capable of playing the stream, called a reproduction device; and
a second device, called a control device, separate from the first device and integrating:
  user interface means for allowing a user of the second device to select on the second device the data stream to be played,
  means for, following the selection by the user, transmitting to the first device a command for playing the selected stream, said command containing data for locating the selected stream,
  said data stream being a content stored on a storage device,
  said location data including a storage address of the content on said storage device,
in which the first device comprises:
  (a) means for checking that that the first device is connected to a WiFi access point;
  (b) means for, if the first device is not connected to a WiFi access point:
    setting up a direct wireless connection to the second device and receiving, on said direct wireless connection, from the second device, data for connection to a wireless access point that is distinct from the second device; and
    retrieving the selected stream from the data for locating the selected stream, through said wireless access point.

2. The control system as claimed in claim 1, in which the second device comprises means for assisting connection of the first device to the wireless access point, said means being designed to display a graphical interface for inputting data for connection of the first device to the wireless access point and to transmit said input connection data to the first device.

3. The control system as claimed in claim 1, in which the first device comprises decoding means designed to decode the received data stream.

4. The control system as claimed in claim 1, in which the user interface means for allowing a user to select a data stream comprise means for displaying graphical interface data.

5. The control system as claimed in claim 1, in which said user interface means for allowing a user to select a data stream are designed to access a user interface for selecting content on a remote server.

6. The control system as claimed in claim 1, in which, the first and second devices belong to a local area network managed by the wireless access point, and said user interface means are configured to access a file manager on a storage server for the local area network.

7. The control system as claimed in claim 1, in which the first device is devoid of user interface means for allowing a user to select a data stream to be played.

8. A receiving device for a control system for playing a data stream, the receiving device comprising:
  means for receiving a video data stream to be played, the data stream being a content stored on a storage device,
  means for external output to a device that is capable of playing the received stream,
  means for transmitting the received data stream through the means for external output,
  means for receiving a command for playing the stream from a control device, which is separate from the receiving device, said command containing location data for locating the stream, the location data including a storage address of the content on said storage device,
  means for checking that that the receiving device is connected to a WiFi access point;
  means for, if the receiving device is not connected to a WiFi access point:
    setting up a direct wireless connection to the control device and receiving, on said direct wireless connection, data from said control device for connection to a wireless access point that is distinct from the control device; and
    retrieving the selected stream from the data for locating the selected stream, through said wireless access point.

9. The receiving device as claimed in claim 8, wherein the receiving device is devoid of user interface means for allowing a user to select a data stream to be played.

10. A control device for a control system for playing a data stream, the control device comprising:

user interface means for allowing a user to select a data stream to be played, the data stream being a content stored on a storage device;

means for, following the selection by the user of the data stream to be played, and subsequent to a command from the user for playing the selected stream on a reproduction device that is capable of playing the stream, transmitting to another device a further command for playing the selected stream, said command containing location data for locating the selected stream, the location data including a storage address of the content on said storage device; and means for performing the following acts if the other device is not connected to a WiFi access point:
  connecting to the other device through a direct wireless connection set up by the other device, and
  transmitting, on said direct wireless connection, data for connection of the other device to a wireless access point that is distinct from the control device.

11. The control device as claimed in claim 10, in which the user interface means for allowing the user to select a data stream to be played comprise means for displaying graphical interface data.

12. A control method for playing a data stream, comprising:
  selection by a control device of a data stream to be played using a user interface, the data stream being a content stored on a storage device;
  reception by a receiving device of the data stream to be played, the receiving device being separate from the control device;
  transmission by the receiving device of the received data stream to a reproduction device that is capable of playing the stream;
  transmission by the control device to the receiving device, following the selection by a user of the data stream to be played, of a command for playing the selected stream, said command containing location data for locating the selected stream, the location data including a storage address of the content on said storage device, wherein the command is transmitted following a further command from the user for playing the selected stream on the reproduction device; and
  checking that that the receiving device is connected to a WiFi access point;
  if the receiving device is not connected to a WiFi access point, the receiving device:
    setting up a direct wireless connection to the control device and receiving, on said direct wireless connection, from the control device, data for connection to a wireless access point that is distinct from the control device; and
    retrieving the selected stream from the data for locating the selected stream, through said wireless access point.

13. The method as claimed in claim 12, in which
  the receiving device sets up the direct wireless connection to the control device and transmits to the control device a request for connection to a wireless access point; and
  the control device displays a graphical interface for inputting data for connection of the receiving device to a wireless access point and then, following the input of data for connection to a wireless access point by a user, transmits said input connection data to the receiving device.

14. The control system as claimed in claim 1, wherein the control device is configured to decode and play the selected stream, is separate from the reproduction device, and comprises:
  means for previewing the data stream to be played on the second device following the selection by the user.

15. The control device as claimed in claim 10, wherein the control device is configured to decode and play the selected stream, is separate from the reproduction device, and comprises:
  means for previewing the data stream to be played on the second device following the selection by the user.

* * * * *